US011581739B2

(12) United States Patent
Gjerpe et al.

(10) Patent No.: US 11,581,739 B2
(45) Date of Patent: Feb. 14, 2023

(54) POWER DISTRIBUTION ON A VESSEL

(71) Applicants: Siemens Energy Global GmbH & Co. KG, Munich (DE); SIEMENS ENERGY AS, Oslo (NO)

(72) Inventors: Paul Fredrik Gjerpe, Oslo (NO); Bernd Hartwig, Erlangen (DE); Marc Hiller, Bretten (DE); Wolfgang Voss, Oberreichenbach (DE)

(73) Assignees: SIEMENS ENERGY GLOBAL GMBH & CO. KG, Munich (DE); SIEMENS ENERGY AS, Oslo (NO)

( * ) Notice: Subject to any disclaimer, the term of this patent is extended or adjusted under 35 U.S.C. 154(b) by 444 days.

(21) Appl. No.: 15/539,851

(22) PCT Filed: Dec. 11, 2015

(86) PCT No.: PCT/EP2015/079340
§ 371 (c)(1),
(2) Date: Jun. 26, 2017

(87) PCT Pub. No.: WO2016/113046
PCT Pub. Date: Jul. 21, 2016

(65) Prior Publication Data
US 2017/0373502 A1    Dec. 28, 2017

(30) Foreign Application Priority Data

Jan. 15, 2015 (EP) .................................. 15151256

(51) Int. Cl.
*H02J 3/38* (2006.01)
*H02J 4/00* (2006.01)
*B63H 23/24* (2006.01)

(52) U.S. Cl.
CPC .................. *H02J 3/38* (2013.01); *H02J 4/00* (2013.01); *B63H 23/24* (2013.01)

(58) Field of Classification Search
CPC combination set(s) only.
See application file for complete search history.

(56) References Cited

U.S. PATENT DOCUMENTS

| 8,975,784 B2 * | 3/2015 | Tardy ........................ H02J 3/06 323/284 |
| 2004/0069251 A1 * | 4/2004 | Rzadki ....................... H02J 4/00 123/3 |

(Continued)

FOREIGN PATENT DOCUMENTS

| CN | 100386936 C | 5/2008 |
| CN | 101351381 A | 1/2009 |

(Continued)

OTHER PUBLICATIONS

EP Search Report dated Jun. 9, 2015, for EP patent application No. 15151256.3.

(Continued)

*Primary Examiner* — Daniel Kessie
(74) *Attorney, Agent, or Firm* — Wolter Van Dyke Davis, PLLC

(57) ABSTRACT

An arrangement for power distribution on a vessel, having: a first DC bus operating at a first medium voltage; at least one second DC bus operating at a second medium voltage and having no direct connection with the first DC bus; a first AC bus operating at a low voltage; a first inverter coupled between the first DC bus and the first AC bus for allowing power flow from the first DC bus to the first AC bus in a first operation mode; a second AC bus operating at the low voltage; a second inverter coupled between the second DC bus and the second AC bus for allowing power flow from the second DC bus to the second AC bus in the first operation mode; a low voltage connection system for selectively connecting or disconnecting the first AC bus and the second AC bus.

18 Claims, 2 Drawing Sheets

(56) References Cited

U.S. PATENT DOCUMENTS

| | | | |
|---|---|---|---|
| 2007/0077830 A1 | 4/2007 | Rzadki et al. | |
| 2010/0193630 A1 | 8/2010 | Duces et al. | |
| 2013/0307444 A1 | 11/2013 | Settemsdal | |
| 2014/0097683 A1* | 4/2014 | Piyabongkarn | H02J 3/38 |
| | | | 307/26 |

FOREIGN PATENT DOCUMENTS

| | | |
|---|---|---|
| CN | 202231465 U | 5/2012 |
| CN | 104015912 A | 9/2014 |
| EP | 2394908 A1 | 12/2011 |
| EP | 2623416 A1 | 8/2013 |
| EP | 2654157 A1 | 10/2013 |
| KR | 20140007883 A | 1/2014 |
| KR | 20140008004 A | 1/2014 |

OTHER PUBLICATIONS

International Search Report dated Feb. 19, 2016, for PCT/EP2015/079340.

* cited by examiner

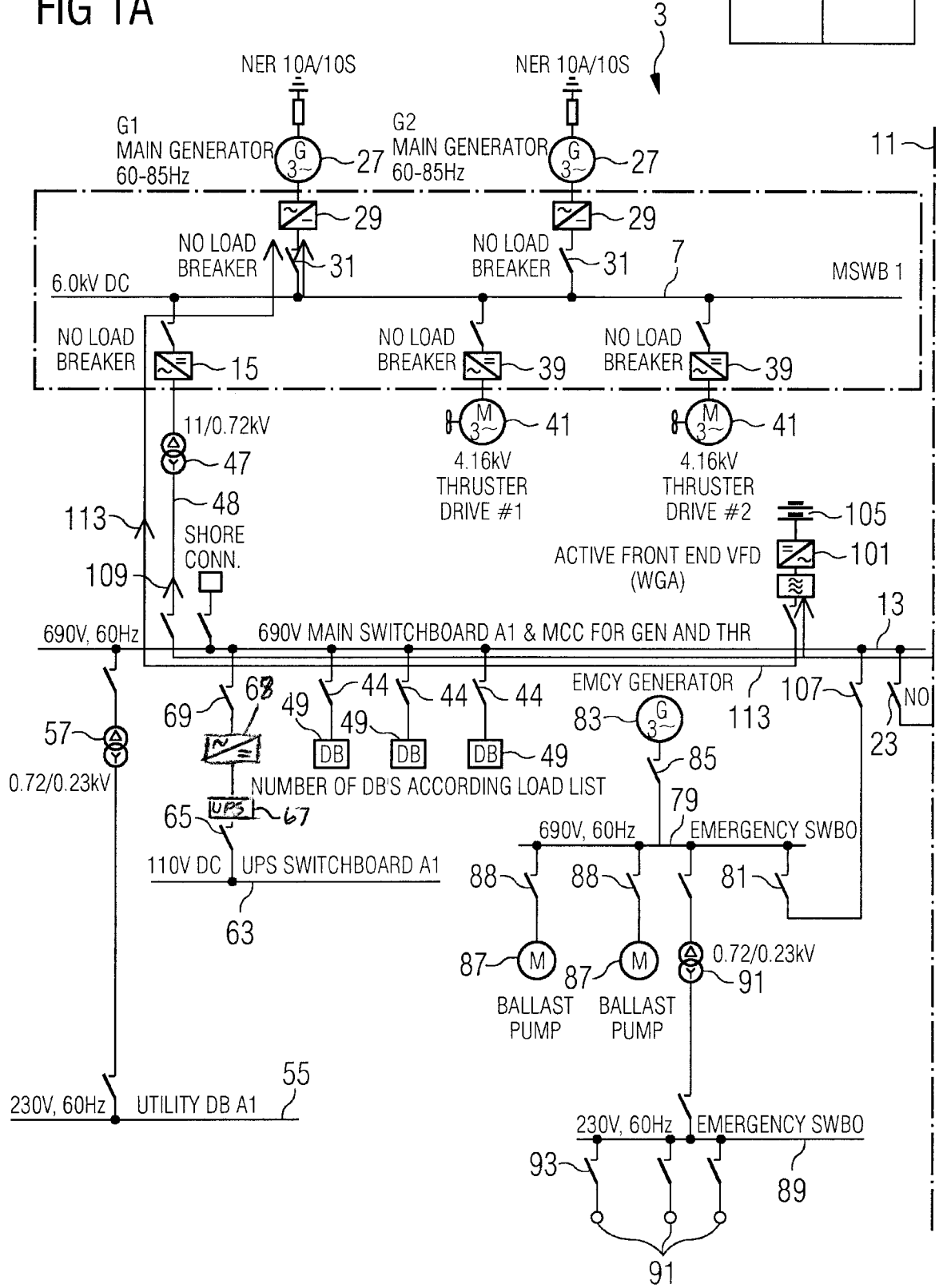

POWER DISTRIBUTION ON A VESSEL

CROSS REFERENCE TO RELATED APPLICATIONS

This application is the US National Stage of International Application No. PCT/EP2015/079340 filed Dec. 11, 2015, and claims the benefit thereof. The International Application claims the benefit of European Application No. EP15151256 filed Jan. 15, 2015. All of the applications are incorporated by reference herein in their entirety.

FIELD OF INVENTION

The present invention relates to an arrangement and to a method for power distribution on a vessel, in particular a ship or a platform.

BACKGROUND OF INVENTION

For operating a vessel, in particular a ship or a platform, e.g. oil exploration platform, electric energy needs to be distributed to a number of consumers. For example, thrusters and pumps need to be operated on a vessel. The different consumers require different voltage or may require AC power or DC power. In the state-of-the-art, medium voltage distribution systems which have traditional switch gears, transformers and VFDs may have been used, to provide necessary power to the plural consumers. These conventional systems may require steady or constant frequency. Thus, a main generator or prime mover may be needed to be run at a certain speed or rotational speed. Furthermore, all load changes will have to be provided by the prime movers. Alternatively, in the prior art, low voltage multi-drive systems have been used, with DC breakers between the sections. The optional DC breaker gives the possibility for having a close ring connection and therefore a more efficient load sharing. In case of a failure, the DC breaker may secure the fast disconnection and limiting of the short circuit current.

However, conventional power distribution and systems may have some disadvantages and technical problems. In particular, a large amount of equipment of voluminous space and also a considerable amount of cables may be required for the conventional systems. Furthermore, generators need to have a considerable capacity.

Thus, there may be a need for an arrangement and a method for power distribution on a vessel which requires less heavy or complex equipment, and which may be operated in a secure and reliable manner.

EP2623416 describes a system with diesel generators to produce electrical power and converter units to convert from AC to DC. DC is supplied to consumers. A control device controls rotation speed of each generator according to the power required.

SUMMARY OF INVENTION

According to an embodiment of the present invention, an arrangement for power distribution on a vessel is provided, comprising a first DC bus operating at a first medium voltage, at least one second DC bus (in particular several second DC buses) operating at a second medium voltage and having no direct connection with the first DC bus, a first AC bus operating at a low voltage, a first inverter coupled between the first DC bus and the first AC bus for allowing power flow from the first DC bus to the first AC bus in a first operation mode, a second AC bus operating at the low voltage, a second inverter coupled between the second DC bus and the second AC bus for allowing power flow from the second DC bus to the second AC bus in the first operation mode; a low voltage connection system for selectively connecting or disconnecting the first AC bus and the second AC bus or vice versa; wherein the arrangement is adapted, in a second operation mode to connect the first AC bus and the second AC bus via the low voltage connection system and to control the first inverter and the second inverter, in order to supply power from the second DC bus via the second inverter to the second AC bus, from the second AC bus to the first AC bus and from the first AC bus via the first inverter to the first DC bus or vice versa.

According to an embodiment of the present invention there is power flow from one power system inverter through another power system inverter and vice versa.

The arrangement may further be adapted to generate the power and also supply the power to plural consumers. The first DC bus and/or the second DC bus may comprise a number of cable sections, i.e. electrical conductors which comprise wires that are isolated from each other in order to maintain the medium voltage between the wires. The first DC bus and the second DC bus are independent from each other and may for example or in particular be supplied with electrical energy from independent generators. The first DC bus and the second DC bus may be spaced apart from each other and there is no direct connection between the first DC bus and the second DC bus. Thereby, in case of a (power) failure in one of the first or the second DC bus, the respective other DC bus may serve as the sole energy supply (the energy being generated by its respective generators) to power those consumers which are connected to the still operating DC bus as well as to operate those consumers which are connected to the DC bus in which the failure occurred. Thereby, electric power available in one of the DC buses may substitute electric energy required in the other DC bus or in an associated power distribution system including also the AC bus and further sub-circuits or sub-buses.

The AC buses (the first AC bus and the second AC bus) may provide a one-phase or three-phase or even higher phase bus, in particular operating at a frequency between 50 Hz and 100 Hz. To operate the first DC bus at a first medium voltage and to operate the second DC bus at a second medium voltage may be advantageous in that it may reduce the size or cross-sectional size of the cable compared to the case when the DC buses would be operated at lower voltages. The inverter (for example the first inverter and the second inverter or also the below mentioned consumer inverter or battery inverter) may have the ability to convert a DC power stream to an AC power stream having adjustable frequency and/or vice versa.

The inverters may for example comprise semiconductor power elements, in particular power transistors, such as IGBTs. For example, for converting a three-phase power stream to a DC power stream, the three input phases may be supplied each between two power transistors which are connected in series between two DC terminals. The power transistors may be supplied with appropriate gate driving signals which switch the power transistors on and off (in particular using pulse width modulation techniques) such that the three-phase power stream is converted to the DC power stream between the DC terminals. Furthermore, a capacitor may be connected between the DC terminals. The inverter may be operated in two opposite directions, i.e. may be operated to convert a DC power stream to an AC power stream or may be operated to convert an AC power stream to a DC power stream.

The mode of operation of the inverter may be switched when the arrangement transitions from one operation mode to another operation mode. Thereby, the specified first operation mode may be regarded as a normal operation mode, in which both systems, i.e. the first system comprising the first DC bus, the first AC bus and the first inverter, and in which also the second system, i.e. comprising the second DC bus, the second AC bus and the second inverter, both operate in a normal way without any failure. Furthermore, in the normal operation mode, generators associated with the first system or the second system operate properly and provide electric energy to the first system and the second system, respectively.

The DC buses may be provided to power a number of consumers which require relatively higher voltage, for example the first medium voltage or the second medium voltage. In contrast, the AC buses may be operated to provide power to other consumers which may require a lower voltage, for example the low voltage.

According to an embodiment of the present invention, the arrangement comprises two or more DC buses with inverters that share power via a sub-AC distribution network. Thereby, the DC voltage (in particular the first medium voltage and the second medium voltage) may be different, by introducing a transformer on the inverter side. Although a low voltage multi-drive solution may have introduced a flexible way of providing power to the consumers in a power plant, several disadvantages may have been observed. In particular, for larger power ratings, a medium voltage solution may be desired because of the requirement for a huge number and a huge size of the cabling. The embodiments of the present invention provide the medium voltage at the DC buses, thereby reducing the requirements regarding the size of the cabling. Embodiments of the present invention provide a more flexible way of power flow between the various power sections. Furthermore, embodiments of the present invention allow the possibility to connect batteries with low voltage (or other energy storage devices) as a flexible power source to the medium voltage network. Furthermore, other embodiments of the present invention may provide the possibility for a close ring connection and load sharing via flexible connection between the bus sections.

Embodiments of the present invention may provide the following advantages: A cost-effective power plant may be constructed with fewer transformers, less required space, less requirements on cables. Furthermore, the possibility for multi-voltage level power plants is provided. Further, the generators may be scaled down and a high number of low voltage cables may be reduced or even avoided.

Furthermore, the generators may consume less fuel than in conventional systems. Further, the possibility of a soft start of consumers of the power distribution system may be provided. The generators may require less maintenance. Further, a seamless integration of batteries or other low voltage power sources may be allowed. Further, the system may have a faster response time, in particular when a power failure occurs.

In the second operation mode, a flow of power from the second DC system to the first DC system is enabled, in order to support the first power distribution system. Thereby, any direct connection between the first DC bus and the second DC bus is avoided. In particular, in conventional systems, the connection between respective DC buses may require heavy, complex and costly equipment and the operation of this equipment may be complicated. These disadvantages are avoided by embodiments of the present invention. In particular, converters between the DC buses and the AC buses may be present anyway in order to provide electric energy from the DC buses to the respective AC bus. These inverters may be, in a synergistic way, be used to transfer electric energy from the second DC bus to the first DC bus without requiring any further equipment or components. Thereby, the complexity of the system may be reduced and the costs may be reduced.

Thereby, the second operation mode may be adopted when a power failure (for example failure in a generator, a short circuit in a cable or the like) occurs in the first DC bus (or associated components). Thereby, it may be ensured that also consumers which are connected to one of the buses of the first system may be properly operated.

According to an embodiment of the present invention, the arrangement further comprises a first transformer coupled between the first inverter and the first AC bus for transforming the first medium voltage to the low voltage and a second transformer coupled between the second inverter and the second AC bus for transforming the second medium voltage to the low voltage.

Thereby, a reliable transformation of the first medium voltage to the low voltage and transformation of the second medium voltage to the low voltage may be enabled. Furthermore, the transformer(s) may be operated in a reverse manner, thus transforming the low voltage to the first medium voltage or transforming the low voltage to the second medium voltage. Thereby, a reliable exchange of electric energy between the different buses may be enabled.

According to an embodiment of the present invention, the arrangement further comprises at least one first and/or a second AC consumer, in particular a thruster, a first and/or second consumer inverter coupled to the first respectively second AC consumer and connectable to the first respectively second DC bus for providing power to the first respectively second AC consumer.

The consumer inverter may be controlled to transform the DC power stream to an AC power stream which is suitable to drive the respective AC consumer. In particular, a rotational speed of the thruster may be adjusted by adjusting the frequency of the AC power stream output by the respective consumer inverter. Thereby, a high flexibility may be achieved to power different consumers which may require different frequency of an AC power stream.

According to an embodiment of the present invention, the arrangement further comprises a first and/or second battery, a first and/or battery inverter coupled to the first respectively second battery and being connectable to the first respectively second AC bus, wherein, in a third operation mode, the first respectively second battery is connected to the first respectively second consumer inverter (directly) via (or not via) the first respectively second inverter, in order to supply power from the first respectively second battery to the first respectively second AC consumer.

The battery may serve as a backup energy source in case of a failure. The battery (or accumulator or other energy storage device) may be charged during normal operation, in order to save energy for a failure situation. The battery or accumulator providing DC power may be directly connected to the consumer inverter, in particular to a DC input section of the consumer inverter.

Thereby, each inverter may comprise a DC-section and an AC-section. The DC-section may be used as an input or an output and the AC-section may be used as an output or as an input of the respective inverter. For the consumer inverter, the DC-section may be used as an input and the AC-section may be used as an output which is then connected to the AC consumer, in particular a thruster. However, the first inverter, the second inverter and the battery inverter may be each operated in two different directions in which in one case the DC-section is an input section and the AC-section is an output section or in another case where the DC-section is an output section and the AC-section is an input section. Thereby, in case of a failure of the generators of the first system and the generator also of the second system, the battery may still power the AC consumers, in order to keep the vessel operable.

According to an embodiment of the present invention, in a fourth operation mode, the first and/or second battery is connected via the first respectively second battery inverter, the first respectively second AC bus, the first respectively second transformer and the first respectively second inverter to the first respectively second DC bus, in order to allow power flow there between.

In the fourth operation mode, the battery may be charged from the respective DC bus via the respective inverter or, in case of a failure, the battery may power via the respective inverter the respective DC bus in order to provide electric energy to consumers connected to the respective DC bus. Thereby, a high flexibility and high security may be provided.

According to an embodiment of the present invention, the arrangement further comprises a first and/or second secondary AC bus operating at a very low voltage, a first and/or second secondary transformer connectable between the first respectively second AC bus and the first respectively second secondary AC bus.

The secondary AC buses may be used for several different purposes, in order to power further consumers. Thereby, the range of supported consumers may be extended.

According to an embodiment of the present invention, the arrangement further comprises a first and/or second UPS switchboard and a first and/or second uninterruptible power supply connectable between the first respectively second AC bus and the first respectively second UPS switchboard.

The UPS switchboard and the uninterruptible power supply may provide additional safety in case of failures.

According to an embodiment of the present invention, the arrangement further comprises a low voltage emergency switchboard connectable to the first AC bus, an emergency generator connectable with the emergency switchboard, wherein one or more consumers, in particular including pumps, are connectable to the low voltage emergency switchboard.

The emergency generator may power the low voltage emergency switchboard which may allow powering essential components of the vessel, such as a ballast pump or a fire pump. Thereby, additional safety is provided. The low voltage emergency switchboard may be connected to the first AC bus under normal conditions, in order to power the essential consumers by the normal power supply.

According to an embodiment of the present invention, the arrangement further comprises a very low voltage emergency switchboard connected to the low voltage emergency switchboard via a transformer, wherein one or more consumers are connectable to the very low voltage emergency switchboard.

The very low voltage emergency switchboard may be used to power further potentially essential components of the vessel, to keep the vessel operable.

Furthermore, the arrangement may comprise a controller which is adapted, in particular using frequency droop control, to control breakers (or switches, in particular the low voltage connection system), inverters and/or generators (such as Diesel generators or gas generators), in particular to control generator speed, in dependence of power requirements of the consumers and in dependence of a failure condition.

In particular, a central controller may be provided which receives measurement signals regarding plural electrical measurements at plural locations within the first system and/or the second system. The controller may in particular generate pulse width modulation signals for the inverter or may supply reference signals, such as voltage reference, current reference or power factor reference to the inverters. Thereby, a safe and reliable operation may be enabled.

Further, plural low voltage AC consumers may be connectable (via switches or breakers) to the first AC bus or the second AC bus.

According to an embodiment of the present invention, the first medium voltage is different from the second medium voltage, wherein in particular the first medium voltage and the second medium voltage is between 1 kV and 10 kV, wherein further in particular the low voltage is between 500 V and 1 kV, wherein still further in particular the very low voltage is between 300 V and 200 V. Other voltages are possible.

It should be understood that features which are individually or in any combination disclosed, described, mentioned or provided for an arrangement for power distribution on a vessel may also be, individually or in any combination, used for or provided for a method for power distribution according to an embodiment of the present invention and vice versa.

According to an embodiment of the present invention a method for power distribution on a vessel is provided, comprising operating a first DC bus at a first medium voltage, operating at least one second DC bus having no direct connection with the first DC bus at a second medium voltage, operating a first AC bus at a low voltage; allowing power flow from the first DC bus to the first AC bus in a first operation mode by using a first inverter coupled between the first DC bus and the first AC bus, operating a second AC bus at the low voltage, allowing power flow from the second DC bus to the second AC bus in the first operation mode by using a second inverter coupled between the second DC bus and the second AC bus for; selectively connecting or disconnecting the first AC bus and the second AC bus by using a low voltage connection system; wherein in a second operation mode the first AC bus and the second AC bus are connected via the low voltage connection system and control the first inverter and the second inverter, in order to supply power from the second DC bus via the second inverter to the second AC bus, from the second AC bus to the first AC bus and from the first AC bus via the first inverter to the first DC bus or vice versa.

According to an embodiment of the present invention, in a marine power plant, it is provided a medium voltage multi-drive system (>1 kV) which may have a low voltage (<1 kV) distribution network. The power plant may be segregated in two or more sections which may use the low voltage distribution system as a free flow of power between the medium voltage multi-drive system. The control of power flow may be done by utilizing frequency droop control, to ensure the integrity of the system. Further, the power flow may be from the medium voltage multi-drive in and out of a low voltage battery via a low voltage active front end.

Embodiments of the present invention may have the advantages to be compact, low cost, high redundancy. Further, battery backup may keep the vessel in position after blackout, thereby adding a further safety to the operation. Furthermore, seamless flow of power between systems may be provided, giving flexibility of configuration. Further, the generators may consume lower fuel. Further, soft start of the distribution system may be enabled. Further, a stable frequency on the grid may be achieved. The generators may require less maintenance and there may be a cleaner exhaust with less fumes due to more stable load condition (battery may work as a load shaver).

Embodiments of the present invention will now be described with reference to the accompanying drawings. The invention is not restricted to the described or illustrated embodiments.

DETAILED DESCRIPTION OF INVENTION

Figure 1B:
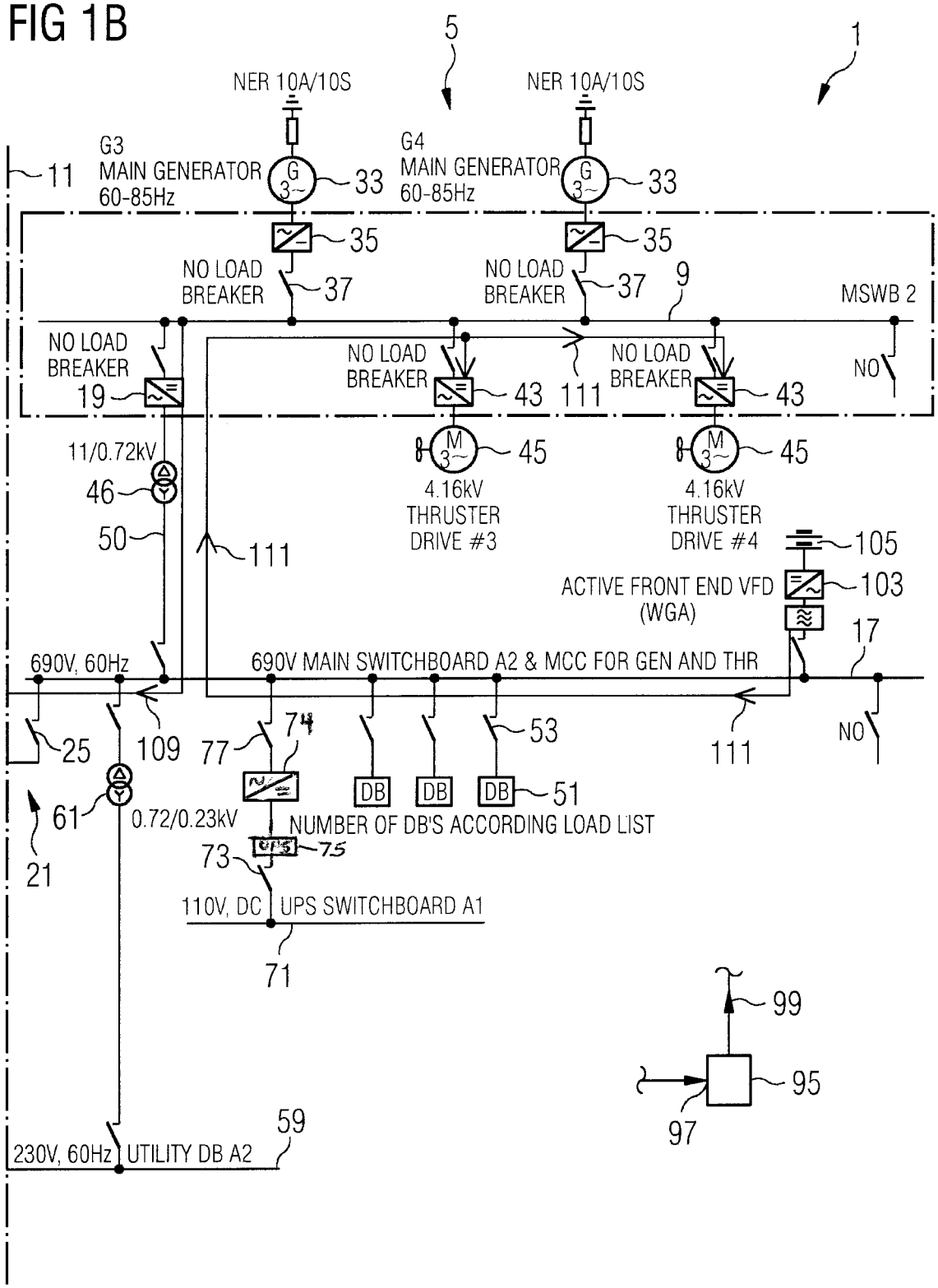
FIG. 1 illustrates a schematic circuit diagram of an arrangement for power distribution on a vessel according to an embodiment of the present invention which is adapted to perform a method for power distribution according to an embodiment of the present invention.

The schematic circuit diagram of the arrangement 1 for power distribution on a vessel illustrates a first system 3 and a second system 5 which share a number of features. The first system 3 comprises a first DC bus 7 which operates at a first medium voltage, in the illustrated example 6.0 kV DC. Similarly, the second system 5 comprises a second DC bus 9 which operates at a second medium voltage, for example between 5 kV and 10 kV DC. As is indicated in the FIGURE, the first DC bus 7 and the second DC bus 9 are separated by a barrier 11, they are independent from each other and/or are spaced apart from each other. Thus, there is no direct connection between the first DC bus 7 and the second DC bus 9.

The first system 3 further comprises a first AC bus 13 which operates at a low voltage, in the illustrated example 690 V, 60 Hz AC. A first inverter 15 is coupled between the first DC bus 7 and the first AC bus 13. The second system 5 comprises a second AC bus 17 which operates at the low voltage, i.e. 690 V, 60 Hz AC. A second inverter 19 is coupled between the second DC bus 9 and the second AC bus 17. Furthermore, the arrangement 1 comprises a low voltage connection system 21 comprising switches 23 and 25 for selectively connecting or disconnecting the first AC bus 13 and the second AC bus 17.

A number of first generators 27 is coupled, via respective generator inverters 29, to the first DC bus 7, in order to supply electric energy to the first DC bus 7. For connecting or disconnecting the generators 27, switches 31 are provided between the respective generator and the first DC bus. The second system 5 comprises in a similar manner and connection second generators 33 which, via second generator inverters 35, are connected via switches 37 to the second DC bus 9. More or less generators 27 or generators 33 may be connected to the first DC bus 7 and second DC bus 9, respectively.

The first DC bus 7 is connected via consumer inverters 39 to AC consumers 41, in the illustrated example thrusters. More or less AC consumers 41 may be connected to the first DC bus 7. Similarly, the second DC bus 7 is connected, via consumer inverters 43, to second AC consumers 45.

The first DC bus 7 provides via the first inverter 15 and a first transformer 47 electric energy to the first AC bus 13. Thereby, the inverter 15 converts the DC power stream to an AC power stream and the transformer 47 transforms the first medium voltage 6.0 kV DC to the low voltage 600 V, 60 Hz AC. Plural consumers 49 are connected, via switches 44, to the first AC bus 13 and plural consumers 51 are connectable via switches 53 to the second AC bus 17.

A first secondary AC bus 55 is connected via a first secondary transformer 57 to the first AC bus 13. A second secondary AC bus 59 is connected via a second secondary transformer 61 to the second AC bus 17. A first UPS switchboard 63 is via a switch 65 connected to an uninterruptible power supply 67 which is, via a further switch 69, connectable to the first AC bus 13. A second UPS switchboard 71 is, via a switch 73, connectable to a second uninterruptible power supply 75 which is connectable via a switch 77 to the second AC bus 17. Inverters 68, 74 may be used when connecting the uninterruptible power supplies, depending upon the style of UPS utilized.

A low voltage emergency switchboard 79 is, via a switch 81, connectable to the first AC bus 13. An emergency generator 83 is connectable, via a switch 85, to the low voltage emergency switchboard 79. One or more consumers 87, in the illustrated example a ballast pump and a fire pump, are connectable, via switches 88, to the low voltage emergency switchboard 79. A very low voltage emergency switchboard 89 is, via a transformer 91, connectable to the low voltage emergency switchboard 79. Further consumers 91 are connectable, via switches 93, to the very low voltage emergency switchboard 89.

A first battery 104 is, via a battery converter 101, connected to the first AC bus 13. A second battery 105 is, via a second battery inverter 103, connectable to the second AC bus 17.

A controller 95 receives measurement signals 97, for example measurement signals of the generators 27, 33, measurement signals of the thrusters or consumers 41, 45, operational signals of the consumers 49, 51, 87, 91 and also measurement signals regarding voltage, current, active power, reactive power in the first DC bus 7, the second DC bus 9, the first AC bus 13 and/or the second AC bus 17 or any conductor connected thereto. In particular, the controller 95 receives information regarding potential failures in one of the systems 3 or 5. Depending on the measurement signals 97 and the failure situation, the controller 95 generates control signals 99 which are provided to the converters 15, 19, 39, 43, 101, 103, 29, 35 and potentially other components of the arrangement 1. Furthermore, control signals are sent to the plural switches, such as switches 31, 37, 23, 25, 81, 88, 93, 65, 69, 73, 53, etc for actuating switching.

The arrangement 1 is operable in a number of operational modes. In a first operational mode, also referred to as normal operation mode, electric energy is provided via the cable 48 from the first DC bus 7 via the first inverter 15 and the first transformer 47 to the first AC bus 13. From there, the consumers 49 are provided with electric energy and also the consumers 87 are provided with electric energy when the switches 107, 81 are closed.

In a second operational mode, in particular when a failure occurs in the first system 3, the switches 23 and 25 of the low voltage connection system 21 are closed so that electric energy is provided to the first DC bus 7, depicted as an energy path 109 via the cable 50 connecting the second DC bus 9 with the second AC bus 17 via the second inverter 19 and the second transformer 46 to the second AC bus 17, via the low voltage connection system 21 to the first AC bus 13 and from there, via the cable 48, the first transformer 47 and the first inverter 15 to the first DC bus 7. From there, the received energy may be distributed to the AC consumers 41 via their respective consumer inverters 39.

In a third operation mode, the second battery 105 (and this may apply in the same way to the first system 3) provides, via an energy flow path 111, electric energy via the second AC bus 17 either directly to the second DC bus 9 or via the cable 50, the second transformer 46 and the second inverter 19 to the second DC bus 9. Thereby, the consumers 45 may be provided with electric energy via their respective consumer inverters 43.

In a fourth operation mode, the first battery 104 (or in an analogous way the second battery 105) is connected via the first battery inverter 101, the first AC bus 13, the first transformer 47 and the first inverter 15 to the first DC bus 7, in order to allow power flow there between via an energy path 113.

In the second operational mode (see energy path 109), power flow between the medium voltage inverter 15 and 19 may occur. In the third operational mode (see energy path 111), power flow between the medium voltage inverters 19 and the low voltage battery 105 may occur via the battery inverters 103. In the fourth operational mode (see energy path 113), power flow between the low voltage batteries 104 and the consumers 39, 41 may occur, e.g. after a blackout.

The invention claimed is:

1. An arrangement for power distribution on a vessel, comprising:
    a first DC bus operating at a first medium voltage;
    at least one second DC bus operating at a second medium voltage and having no direct connection with the first DC bus;
    a first AC bus operating at a low voltage;
    a first inverter and a first transformer coupled between the first DC bus and the first AC bus for transforming the first medium voltage to the low voltage and allowing power flow from the first DC bus to the first AC bus in a first operation mode;
    a second AC bus operating at the low voltage;
    a second inverter and a second transformer coupled between the second DC bus and the second AC bus for transforming the second medium voltage to the low voltage and allowing power flow from the second DC bus to the second AC bus in the first operation mode;
    a low voltage connection system for selectively connecting or disconnecting the first AC bus to the second AC bus;
    wherein the arrangement is adapted, in a second operation mode to connect the first AC bus to the second AC bus via the low voltage connection system and to control the first inverter and the second inverter, in order to supply power from the second DC bus to the first DC bus, via the second inverter and the second transformer that transforms the second medium voltage to the low voltage, to the second AC bus operating at the low voltage, from the second AC bus via the low voltage connection system to the first AC bus operating at the low voltage, and from the first AC bus via the first transformer that transforms the low voltage to the first medium voltage to the first inverter to the first DC bus operating at the first medium voltage, or vice versa.

2. The arrangement according to claim 1, wherein the second operation mode is adopted when a power failure occurs in the first DC bus.

3. The arrangement according to claim 1, further comprising:
    at least one first and/or a second AC consumer;
    a first and/or second consumer inverter coupled to the first respectively second AC consumer and connectable to the first respectively second DC bus for providing power to the first respectively second AC consumer.

4. The arrangement according to claim 3, further comprising:
    a first and/or second battery;
    a first and/or second battery inverter coupled to the first respectively second battery and being connectable to the first respectively second AC bus,
    wherein, in a third operation mode, the first respectively second battery is connected to the first respectively second consumer inverter directly via or not via the first respectively second inverter, in order to supply power from the first respectively second battery to the first respectively second AC consumer.

5. The arrangement according to claim 4,
    wherein, in a fourth operation mode, the first and/or second battery is connected via the first respectively second battery inverter, the first respectively second AC bus, the first respectively second transformer and the first respectively second inverter to the first respectively second DC bus, in order to allow power flow there between.

6. The arrangement according to claim 1, further comprising:
    a first and/or second secondary AC bus operating at a very low voltage;
    a first and/or second secondary transformer connectable between the first respectively second AC bus and the first respectively second secondary AC bus.

7. The arrangement according to claim 1, further comprising:
    a low voltage emergency switchboard connectable to the first AC bus;
    an emergency generator connectable with the emergency switchboard;
    wherein one or more consumers are connectable to the low voltage emergency switchboard.

8. The arrangement according to claim 7, further comprising:
    a second emergency switchboard connected to the low voltage emergency switchboard via a transformer;
    wherein one or more consumers are connectable to the second emergency switchboard.

9. The arrangement according to claim 1, further comprising:
    a controller adapted to control breakers, inverters and/or generators, in dependence of power requirements of the consumers and failure state.

10. The arrangement according to claim 1,
    wherein plural low voltage AC consumers are connectable to the first AC bus or the second AC bus.

11. The arrangement according to claim 6,
    wherein first medium voltage is different from the second medium voltage.

12. A method for power distribution on a vessel, comprising:
    operating a first DC bus at a first medium voltage;
    operating at least one second DC bus having no direct connection to the first DC bus at a second medium voltage;
    operating a first AC bus at a low voltage;
    allowing power flow from the first DC bus to the first AC bus in a first operation mode by using a first inverter and a first transformer coupled between the first DC bus and the first AC bus, wherein the first medium voltage is transformed to the low voltage;

operating a second AC bus at the low voltage;

allowing power flow from the second DC bus to the second AC bus in the first operation mode by using a second inverter and a second transformer coupled between the second DC bus and the second AC bus, wherein the second medium voltage is transformed to the low voltage;

selectively connecting or disconnecting the first AC bus to the second AC bus by using a low voltage connection system;

wherein in a second operation mode the first AC bus and the second AC bus are connected via the low voltage connection system and control the first inverter and the second inverter, in order to supply power from the second DC bus to the first DC bus via the second inverter to the second transformer that transforms the first medium voltage to the low voltage to the second AC bus operating at the low voltage, from the second AC bus to the first AC bus operating at the low voltage via the low voltage connection system, and from the first AC bus via the first transformer that transforms the low voltage to the first medium voltage to the first inverter to the first DC bus operating at the first medium voltage, or vice versa.

13. The arrangement according to claim 3, wherein the at least one first and/or a second AC consumer comprises a thruster.

14. The arrangement according to claim 7, wherein the one or more consumers, including pumps, are connectable to the low voltage emergency switchboard.

15. The arrangement according to claim 9, wherein the controller is adapted, using frequency droop control, to control breakers, inverters and/or generators, including generator speed, in dependence of power requirements of the consumers and failure state.

16. The arrangement according to claim 11, wherein the first medium voltage and the second medium voltage is between 1 kV and 10 kV.

17. The arrangement according to claim 11, wherein the low voltage is between 500 V and 1 kV.

18. The arrangement according to claim 11, wherein the very low voltage is between 300 V and 200 V.

* * * * *